(12) United States Patent
Koike et al.

(10) Patent No.: US 10,809,832 B2
(45) Date of Patent: Oct. 20, 2020

(54) SENSOR UNIT AND INPUT DEVICE EQUIPPED WITH SENSOR UNIT

(71) Applicant: Alps Alpine Co., Ltd., Ota-ku, Tokyo (JP)

(72) Inventors: Yusuke Koike, Niigata-ken (JP); Michiharu Motonishi, Niigata-ken (JP); Kiyoshi Kobayashi, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 16/153,483

(22) Filed: Oct. 5, 2018

(65) Prior Publication Data

US 2019/0050098 A1 Feb. 14, 2019

Related U.S. Application Data

(63) Continuation of application No. PCT/JP2017/006795, filed on Feb. 23, 2017.

(30) Foreign Application Priority Data

Apr. 13, 2016 (JP) ................................. 2016-080265

(51) Int. Cl.
*G06F 3/041* (2006.01)
*G06F 3/042* (2006.01)
(52) U.S. Cl.
CPC ............ *G06F 3/0412* (2013.01); *G06F 3/041* (2013.01); *G06F 3/042* (2013.01)
(58) Field of Classification Search
CPC ......... G06F 3/0412; G06F 3/042; G06F 3/041
See application file for complete search history.

(56) References Cited

U.S. PATENT DOCUMENTS

2005/0046622 A1* 3/2005 Nakanishi ............... G06F 3/045
345/173
2007/0182720 A1 8/2007 Fujii et al.
(Continued)

FOREIGN PATENT DOCUMENTS

JP 2016-18440 A 2/1916
JP 2005-71123 3/2005
(Continued)

OTHER PUBLICATIONS

International Search Report from International Application No. PCT/JP2017/006795 dated Apr. 11, 2017.
(Continued)

*Primary Examiner* — Alexander Eisen
*Assistant Examiner* — Cory A Almeida
(74) *Attorney, Agent, or Firm* — Beyer Law Group LLP

(57) ABSTRACT

A sensor base material and a photic base material such as a polarizing plate are stacked together. An opening is formed in the photic base material. Although the joining part of a flexible wiring board is joined to the sensor base material, a large portion of an opposing edge facing a display and input region, the opposing edge being part of the joining part, is positioned in the opening, so bubbles along the opposing edge are less likely to be generated, making the display quality of the display and input region less likely to be affected. In addition, since the both-side substrate ends of the joining part are sandwiched between the sensor base material and the photic base material, the joining part is less likely to be deformed, making it easy to prevent damage to the sensor base material.

12 Claims, 9 Drawing Sheets

(56) References Cited

U.S. PATENT DOCUMENTS

| | | | |
|---|---|---|---|
| 2009/0315855 A1 | 12/2009 | Oikawa et al. | |
| 2009/0315856 A1* | 12/2009 | Oikawa | G06F 3/045 |
| | | | 345/174 |
| 2011/0205183 A1 | 8/2011 | Sugihara | |
| 2014/0299360 A1* | 10/2014 | Yoshida | H05K 1/09 |
| | | | 174/251 |

FOREIGN PATENT DOCUMENTS

| | | |
|---|---|---|
| JP | 2009-199249 A | 9/2009 |
| JP | 2011-54055 A | 3/2011 |
| JP | 2011-81810 A | 4/2011 |
| JP | 2011-118657 | 6/2011 |
| JP | 2012-247895 | 12/2012 |
| JP | 2015-161998 A | 9/2015 |
| KR | 2009-0131647 | 12/2009 |
| KR | 2014-0106494 | 9/2014 |
| WO | 2010/058495 | 5/2010 |
| WO | 2011/152175 | 12/2011 |

OTHER PUBLICATIONS

European Search Report from European Application No. 17782128.7 dated Nov. 4, 2019.
Korean Office Action from Korean Application No. 2018-7028904 dated Feb. 12, 2020.

* cited by examiner

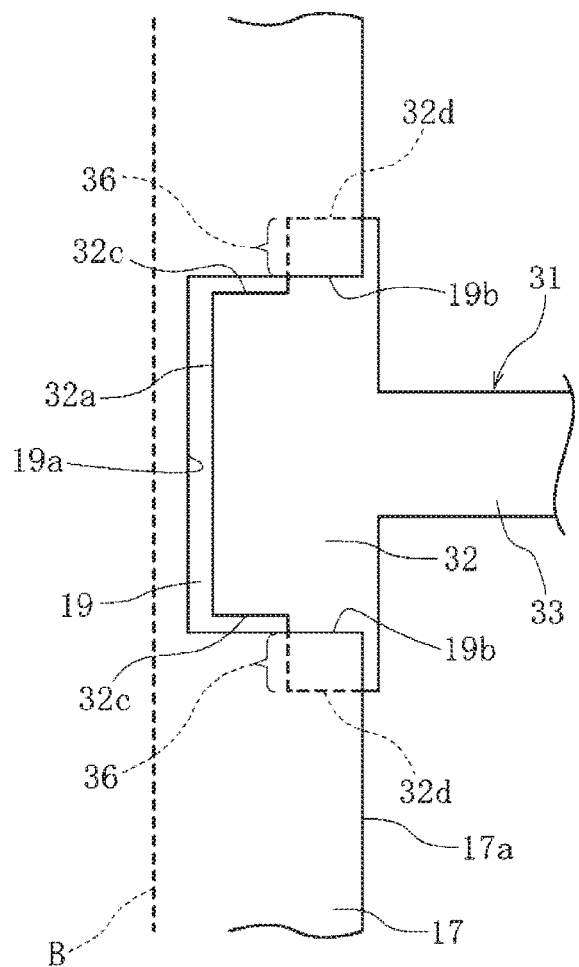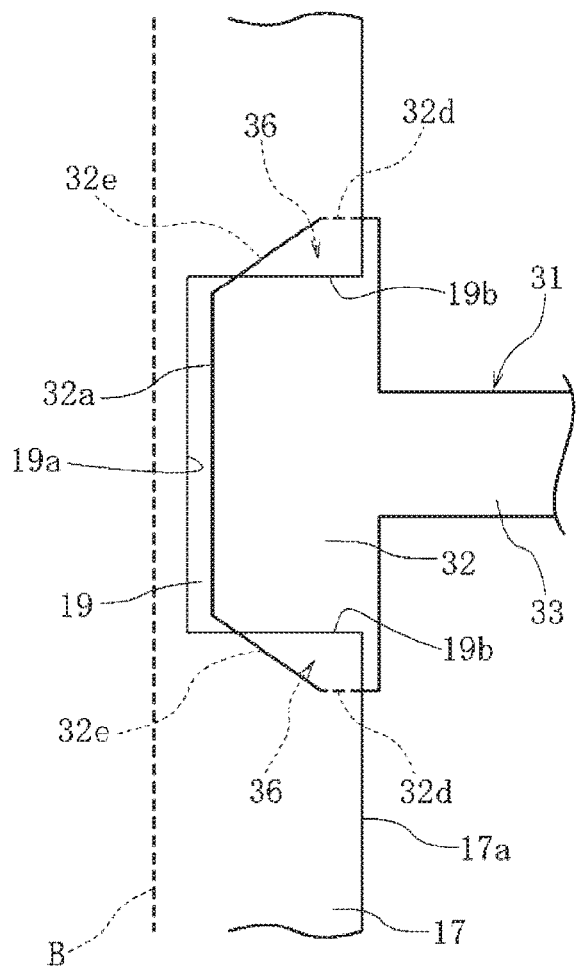

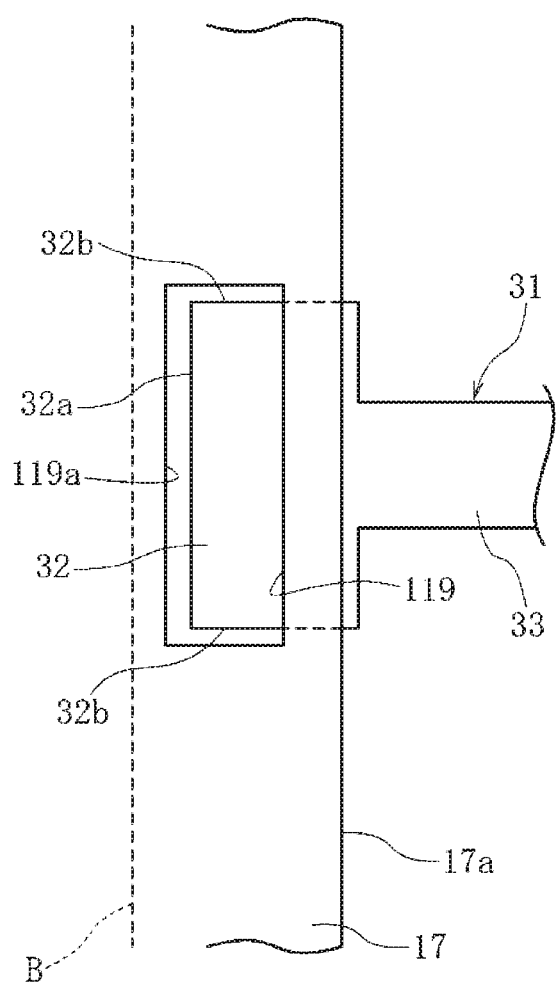
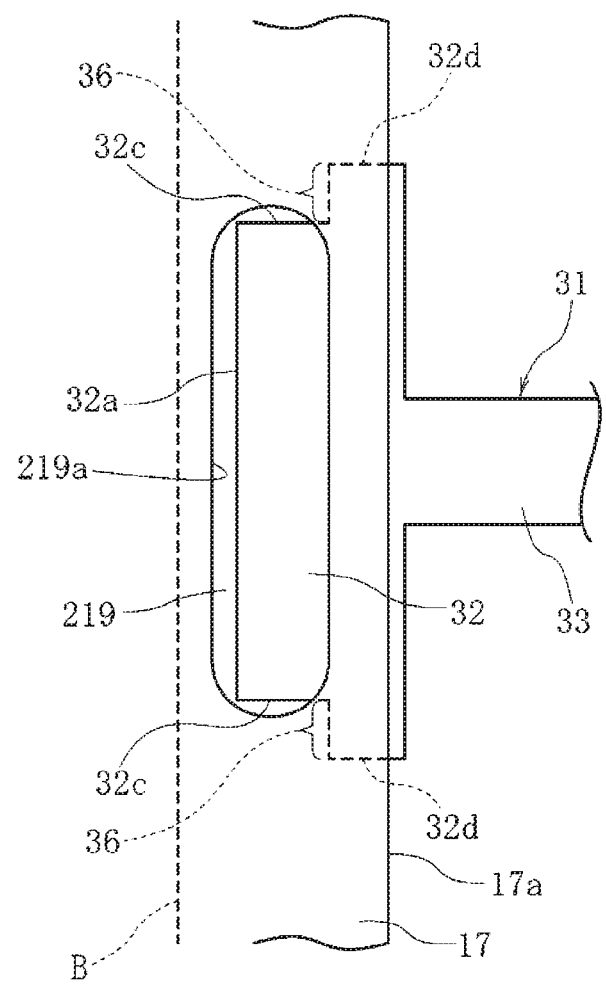

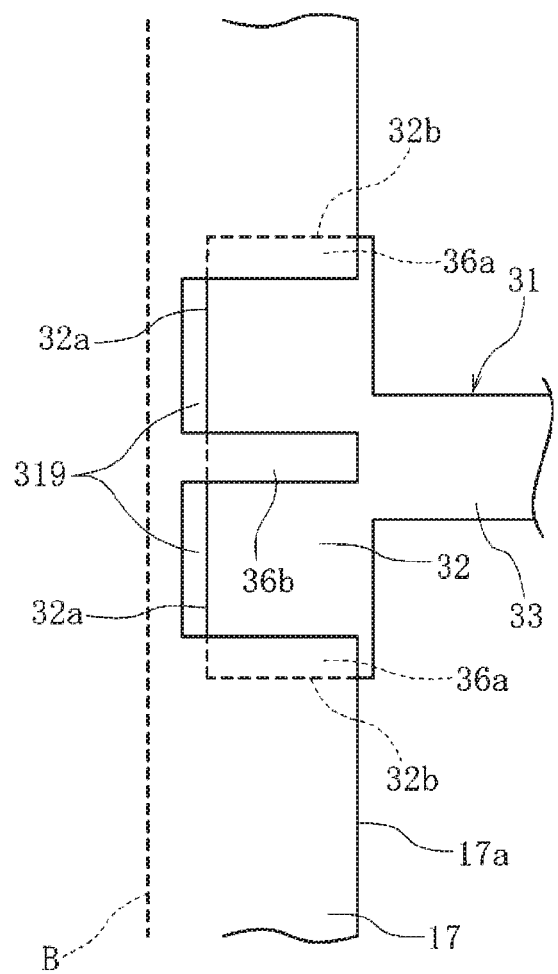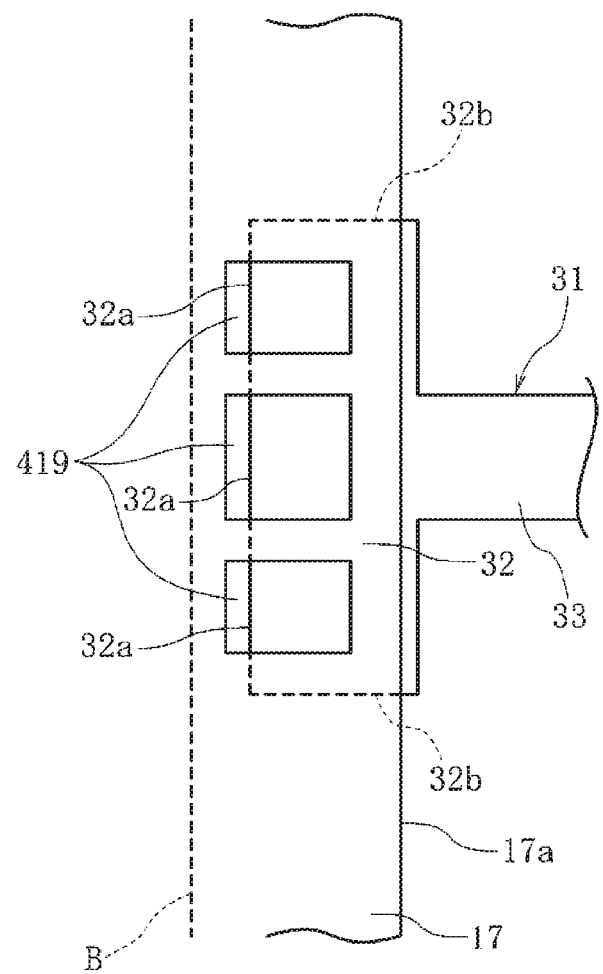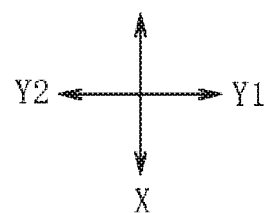

SENSOR UNIT AND INPUT DEVICE EQUIPPED WITH SENSOR UNIT

CLAIM OF PRIORITY

This application is a Continuation of International Application No. PCT/JP2017/006795 filed on Feb. 23, 2017, which claims benefit of Japanese Patent Application No. 2016-080265 filed on Apr. 13, 2016. The entire contents of each application noted above are hereby incorporated by reference.

BACKGROUND OF THE INVENTION

1. Field of the Invention

The present invention relates to a sensor unit structured so that a photic base material, such as optical adjustment base material, is bonded to a sensor base material on which translucent electrode layers are formed and a flexible wiring board is joined to a surface of the sensor base material on the bonding side, and also relates to an input device equipped with the sensor unit.

2. Description of the Related Art

Japanese Unexamined Patent Application Publication No. 2011-81810 describes an invention related to an integrated touch polarizing plate.

This integrated touch polarizing plate has a conductive layer, used for embodying a touch, on a surface of a conductive film. Zero phase difference films and ¼-λ phase difference films are exemplified as conductive films. Polymers, carbon nanotubes, and Ag are exemplified as the material of the conductive layer.

SUMMARY OF THE INVENTION

With the integrated touch polarizing plate described in Japanese Unexamined Patent Application Publication No. 2011-81810, when the conductive film and polarizing plate are mutually bonded with an optical adhesive intervening between them, the flexible wiring board sandwiched between the conductive film and the polarizing plate is too thick to be completely adapted to the thickness of the optical adhesive and a phenomenon is likely to occur in which small voids are left at an edge of the flexible wiring board.

The integrated touch polarizing plate is equipped with a liquid crystal display panel at the lower side of the conductive film and the central portion of the conductive film becomes a display region. Therefore, a display on the liquid crystal display panel can be viewed. If the voids extend to the display region on the conductive film, the display quality of an image viewed on the display region may be affected. Therefore, the edges of the flexible wiring board need to be separated from the display region, and a wide wiring area for joining flexible wiring board needs to be allocated.

A possible solution to avoid the generation of the voids is to form an opening such as a concave part in the polarizing plate and join the flexible wiring board to the conductive film in this opening. In this structure, however, the flexible wiring board is joined not in a laminated portion of the conductive film and polarizing plate but in a portion of the conductive film alone. Therefore, when the pull-out portion of the flexible wiring board is bent, a large bend is generated on the conductive film in the portion where the flexible wiring board is joined.

If a vulnerable material such as a cycloolefin-based film is used as the conductive film, when the flexible wiring board is bent, the cycloolefin-based film or the like may be damaged due to bending stress exerted on the conductive film in the portion where the flexible wiring board is joined.

Even in a case in which a film, such as a PET film, that has a relative high strength is used as the conductive film, if the flexible wiring board is joined to a portion of the PET film alone, when the pull-out portion of the flexible wiring board is bent, a large bend is generated on the PET film. This may cause peeling between the polarizing plate and the conductive film, which is a PET film.

The present invention provides a sensor unit that can prevent large bending stress from being exerted on a sensor base material when a flexible wiring board is bent and also provides an input device equipped with the sensor unit.

In a sensor unit that has a translucent sensor base material and a photic base material bonded to a forward portion of the sensor base material, the present invention is characterized in that:

an opening is formed in an area corresponding to the wiring region on the photic base material, part of the flexible wiring board being sandwiched between the sensor base material and the photic base material, at least part of an opposing edge being positioned in the opening, the opposing edge being one of the edges of the flexible wiring board, the opposing edge facing the display region.

The sensor unit of the present invention is effective for a senor base material that is preferably formed from at least one of a cycloolefin polymer (COP), a cycloolefin copolymer (COC), and a polycarbonate (PC).

With the sensor unit of the present invention, the photic base material is preferably an optical adjustment base material, for example.

The sensor unit of the present invention can be structured under the assumption that the both-side substrate ends of the flexible wiring board are preferably sandwiched between the sensor base material and the photic base material, the both-side substrate ends being positioned at both ends of the flexible wiring board in a direction in which the opposing edge extends.

In this case, it is preferable that the both-side substrate ends sandwiched between the sensor base material and the photic base material be at positions more away from the display region than from the opposing edge.

With the sensor unit of the present invention, the opening is preferably a concave part open to an edge of the photic base material, for example.

In this case, it is preferable that an inner edge of the concave part on the display region side be at a position more away from the edge than from the boundary line between the display region and the wiring region.

With the sensor unit of the present invention, the opening may be at least one hole the circumference of which is enclosed by an inner edge, and the hole may be positioned between the edge of the photic base material and the boundary line between the display region and the wiring region.

An input device of the present invention is characterized in that any sensor unit described above is provided in the input device, a translucent panel member is joined to the surface of the photic base material, and a surface of the panel member is a manipulation surface.

In the present invention, in a sensor unit in which a photic base material such as an optical adjustment base material is joined to a sensor base material, an opposing edge of a flexible wiring board, the opposing edge facing a display region, is positioned in an opening formed in the photic base material. Therefore, it is possible to restrain bubbles from being formed at the opposing edge and thereby to prevent bubbles from affecting the display region. Therefore, the flexible wiring board can be attached at a position close to the display region, so a wide display region can be allocated and a wiring region can be narrowed. The area of a joining portion, on the flexible wiring board, that is joined to the sensor base material can be widened, and the joint of the flexible wiring board can be stabilized.

Since part of the flexible wiring board is sandwiched between the sensor base material and the photic base material, it is possible to prevent large stress from being exerted on the sensor base material alone when the pull-out portion of the flexible wiring board is bent. Therefore, even if the sensor base material is formed from a relatively vulnerable material such as a cycloolefin-based resin film or polycarbonate-based resin film, damage of this film due to bending stress is likely to be prevented. If the sensor base material is formed from a material having high rigidity such as a PET material, when the pull-out portion of the flexible wiring board is bent, it is possible to prevent large stress from being exerted on the sensor base material alone and thereby to restrain a peeling force between the sensor base material and the photic base material from being increased.

BRIEF DESCRIPTION OF THE DRAWINGS

FIGS. 6A and 6B are enlarged plan views, each of which illustrates a joined portion of a flexible wiring board in a sensor unit according to another embodiment;

FIGS. 7A and 7B are enlarged plan views, each of which illustrates a joined portion of a flexible wiring board in a sensor unit according to another embodiment;

FIGS. 8A and 8B are enlarged plan views, each of which illustrates a joined portion of a flexible wiring board in a sensor unit according to another embodiment;

DESCRIPTION OF THE PREFERRED EMBODIMENTS

Figure 1:
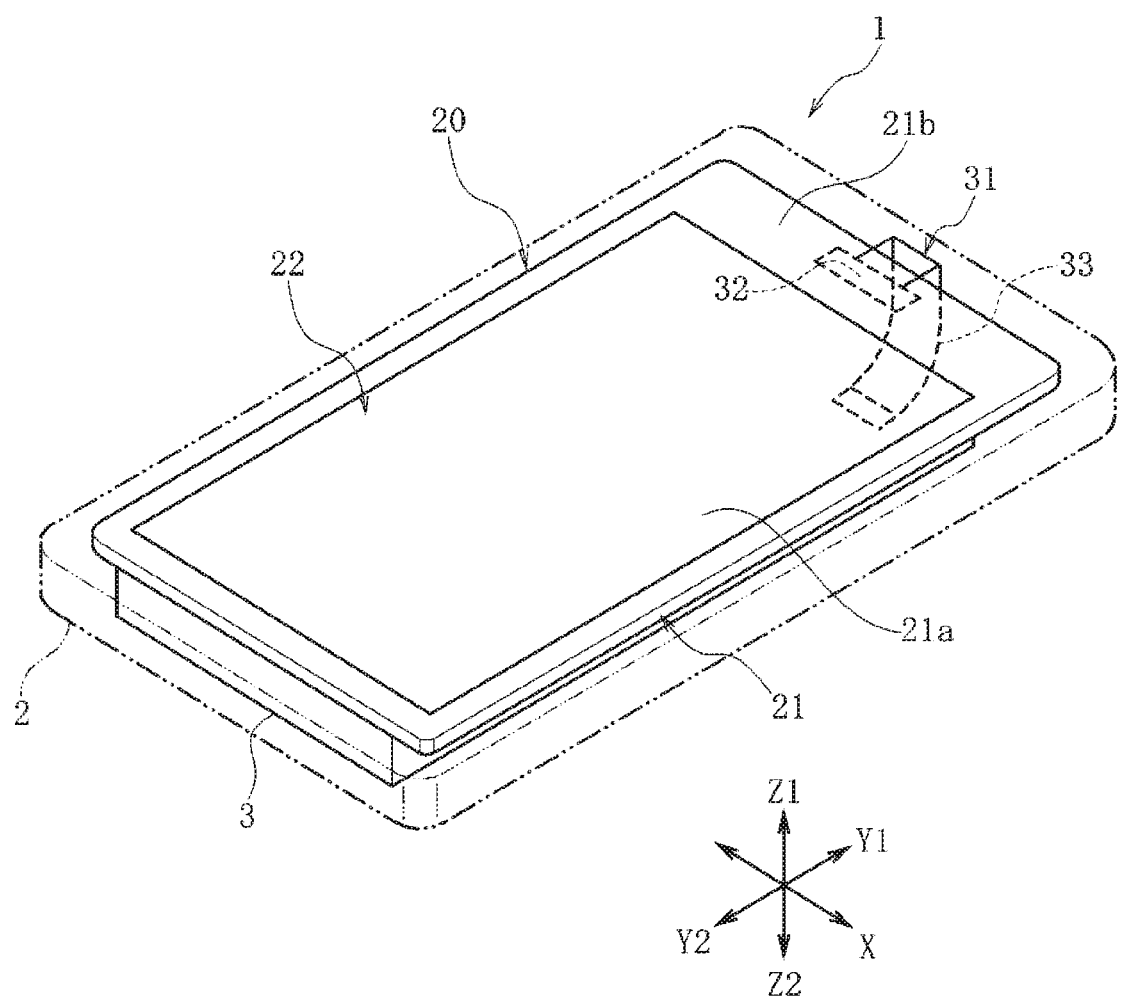
FIG. 1 is a perspective view illustrating an example of an input device having a sensor unit according an embodiment of the present invention and an electronic device in which this input device is mounted.

FIG. 1 illustrates a small electronic device 1 in which an input device 20 is mounted; a sensor unit 10 according an embodiment of the present invention is used in the input device 20. The small electronic device 1 is used as a mobile telephone, a mobile information terminal, a game device, or the like. In FIG. 1 and the later drawings, the X direction is the transversal direction, the Y direction is the longitudinal direction, the Y1 direction is on the bottom side, the Y2 direction is on the top side, the Z1 direction is the forward direction (on the front side), and the Z2 direction is the backward direction (on the rear side).

The small electronic device 1 illustrated in FIG. 1 has a case 2 made of a synthetic resin. A display device 3 such as a color liquid display panel, a circuit board on which various electronic circuits are mounted, and the like are accommodated in the case 2. The input device 20 is placed forward (in the Z1 direction), which is on the display side of the display device 3.

Figure 2:
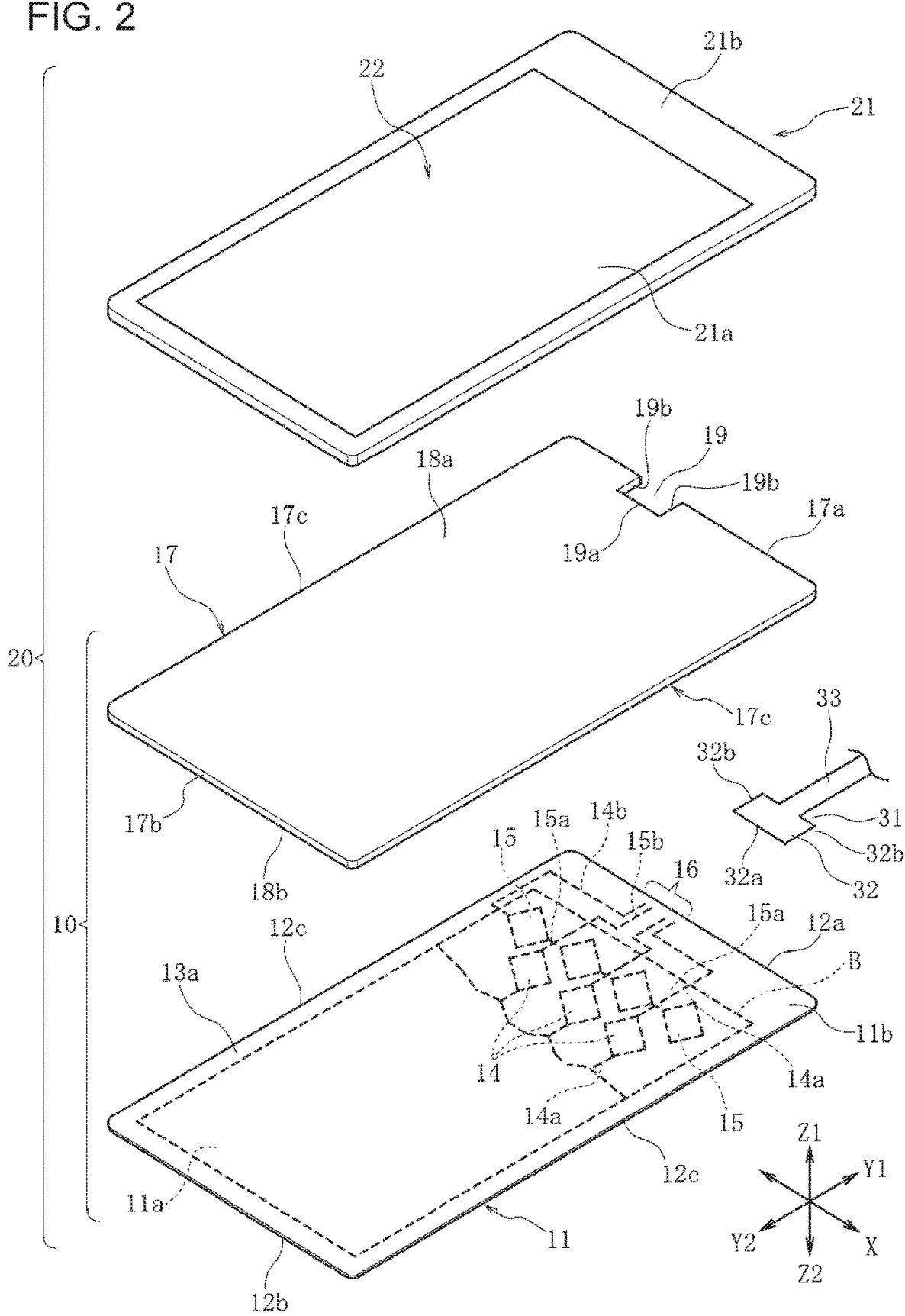
FIG. 2 is an exploded perspective view of the input device having the sensor unit according to the embodiment of the present invention.
Figure 4:
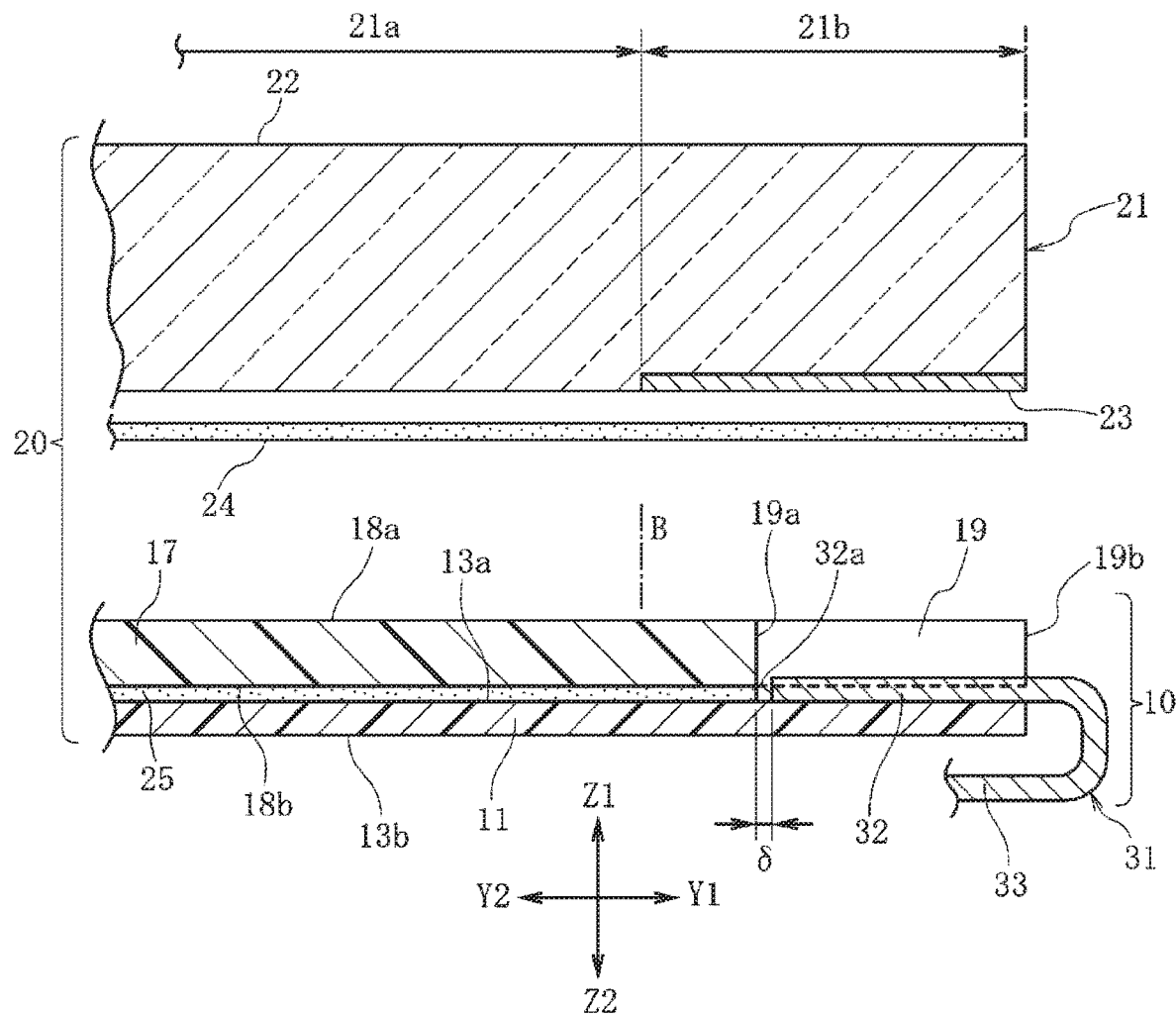
FIG. 4 is a partial cross-sectional view of the sensor unit illustrated in FIG. 3 as taken along line IV-IV, and is a partial cross-sectional view of a panel member bonded to the sensor unit.

The input device 20 is a projection type of touch panel. As illustrated in FIGS. 2 and 4, the input device 20 is composed of the sensor unit 10 and a panel member 21, which is bonded forward of the sensor unit 10.

The panel member 21 is a glass plate or a translucent panel formed from a translucent synthetic resin material such as an acrylic resin, which is, for example, polymethyl methacrylate (PMMA). As illustrated in FIG. 1, the panel member 21 covers the forward (Z1 direction) portion of the case 2 and forms the outside shape of the small electronic device 1 together with the case 2. The surface, facing forward (Z1 direction), of the panel member 21 is a manipulation surface 22.

As illustrated in FIGS. 1, 2, and 4, a rectangular region at the center of the panel member 21 is a display and manipulation region 21a. This display and manipulation region 21a is translucent. The display screen of the display device 3 can be viewed from forward through the display and manipulation region 21a. The panel member 21 has a decorative region 21b, which encloses the display and manipulation region 21a. In the decorative region 21b, a colored portion 23 is formed on a surface of the panel member 21, the surface facing the interior (Z2 direction) of the input device 20, as illustrated in FIG. 4, so the panel member 21 is partially non-translucent. The colored portion 23 is formed in a process such as coating, sputtering, the bonding of a colored film, or the like.

As illustrated in FIG. 4, the input device 20 is structured by using an optical clear adhesive (OCA) 24 to bond the sensor unit 10 positioned in the interior (in the Z2 direction) of the input device 20 and the panel member 21 together.

The sensor unit 10 is also translucent at least at a portion that faces the display and manipulation region 21a of the panel member 21. Translucent in this specification means having transmittance to the extent that a display on the display device 3 can be seen. Specifically, translucent in this specification means that total light transmittance is, for example, 80% or more and is preferably 90% or more.

As illustrated in FIGS. 2 and 4, the sensor unit 10 has a sensor base material 11 and a photic base material 17 stacked on it in the forward direction (Z1 direction). As illustrated in FIG. 4, the sensor base material 11 and photic base material 17 are mutually bonded with an optical clear adhesive (OCA) 25. A flexible wiring board 31 is joined between the sensor base material 11 and the photic base material 17.

As illustrated in FIG. 2, the sensor base material 11, which is rectangular, has an edge 12a, on the bottom side, that extends along the transversal direction (X direction), an edge 12b, on the top side, that also extends along the transversal direction (X direction), and a pair of edges 12c and 12c that extend along the longitudinal direction (Y direction). The sensor base material 11 has a display and input region 11a and a wiring region 11b, which encloses the display and input region 11a. The display and input region 11a is positioned at the central portion of the sensor base material 11 and the wiring region 11b is positioned closer to the edges 12a, 12b, and 12c of the sensor base material 11 than is the display and input region 11a. The display and input region 11a is a display region in the present invention. With the sensor base material 11, a boundary between the display and input region 11a and the wiring region 11b is not clarified. On the sensor base material 11, however, a region that faces the display and manipulation region 21a is the display and input region 11a and a region facing the decorative region 21b is the wiring region 11b.

The sensor base material 11 is a translucent sheet and is preferably formed from at least one of a cycloolefin polymer (COP), a cycloolefin copolymer (COC), and a polycarbonate (PC). The sensor base material 11 is a film that optically has isotropy or a retardation film. COP or COC is highly translucent and is superior in resistance to heat and resistance to chemicals. However, they have low mechanical strength when compared with PET and the like and have a property of being vulnerable to a bending force and the like.

As illustrated in FIG. 4, the sensor base material 11 has a forward surface 13a facing the Z1 side and a backward surface 13b facing in the Z2 direction. A plurality of first electrode layers 14 and a plurality of second electrode layers 15 are formed on the forward surface 13a as illustrated in FIG. 2. The electrode layers 14 and 15 are formed from a material having the translucency and conductivity of an ITO layer, a silver nanowire layer, or the like. The first electrode layer 14 and second electrode layer 15 have the same shape and the same area; their shapes are quadrangular or rhombic. The first electrode layers 14 are regularly arranged so as to form columns in the longitudinal direction (Y direction). The first electrode layers 14 arranged in the Y direction are mutually linked by linking conductive layers 14a and are made electrically continuous. The second electrode layers 15 are regularly arranged so as to form rows in the transversal direction (X direction). The second electrode layers 15 arranged in the X direction are mutually linked by linking conductive layers 15a and are made electrically continuous. A translucent insulating material is interposed at an intersection between the linking conductive layer 14a and the linking conductive layer 15a, insulating the linking conductive layer 14a and linking conductive layer 15a from each other.

A first wiring layer 14b extends from the first electrode layer 14, in each column, linked in the Y direction, and is led out to the wiring region 11b following the edge 12a of the sensor base material 11 on the bottom side. A second wiring layer 15b extends from the second electrode layer 15, in each row, linked in the X direction, and is routed in the wiring region 11b so as to follow the edge 12c on the long edge side, after which the second wiring layer 15b is led out to the wiring region 11b following the edge 12a of the sensor base material 11 on the bottom side. Then, a connector 16, at which the wiring layers 14b and 15b collect, is formed at part of the wiring region 11b following the edge 12a on the bottom side.

As illustrated in FIG. 2, the photic base material 17 is a rectangle having almost the same size as the sensor base material 11 and has an edge 17a on the bottom side, an edge 17b on the top side, and edges 17c and 17c on the long-edge side. The photic base material 17 is preferably an optical adjustment base material, which is a polarizing plate, a ¼-λ phase difference plate, or a lamination of a polarizing plate and a ¼-λ phase difference plate. When a polarizing plate is used as the photic base material 17, the polarizing plate forward of the liquid display panel, which is the display device 3, can be omitted. When a ¼-λ phase difference plate is used, display light of the display device 3, which transmits through the display and input region 11a, can be circularly polarized light, making it possible to prevent black smears, which would otherwise occur when viewed through polarized sunglasses.

Since the photic base material 17 is intended to reinforce the sensor base material 11, the photic base material 17 preferably has higher flexural rigidity than the sensor base material 11. The photic base material 17 may be formed not from an optical adjustment base material but from a highly rigid resin sheet, such as a PET sheet, or the like.

As illustrated in FIG. 4, the photic base material 17 has a forward surface 18a facing in the Z1 direction and a backward surface 18b facing in the Z2 direction. The backward surface 18b of the photic base material 17 and the forward surface 13a of the sensor base material 11 are mutually bonded with the optical clear adhesive 25, and the forward surface 18a of the photic base material 17 and the rear surface of the panel member 21 are mutually bonded with the optical clear adhesive 24.

Figure 3:
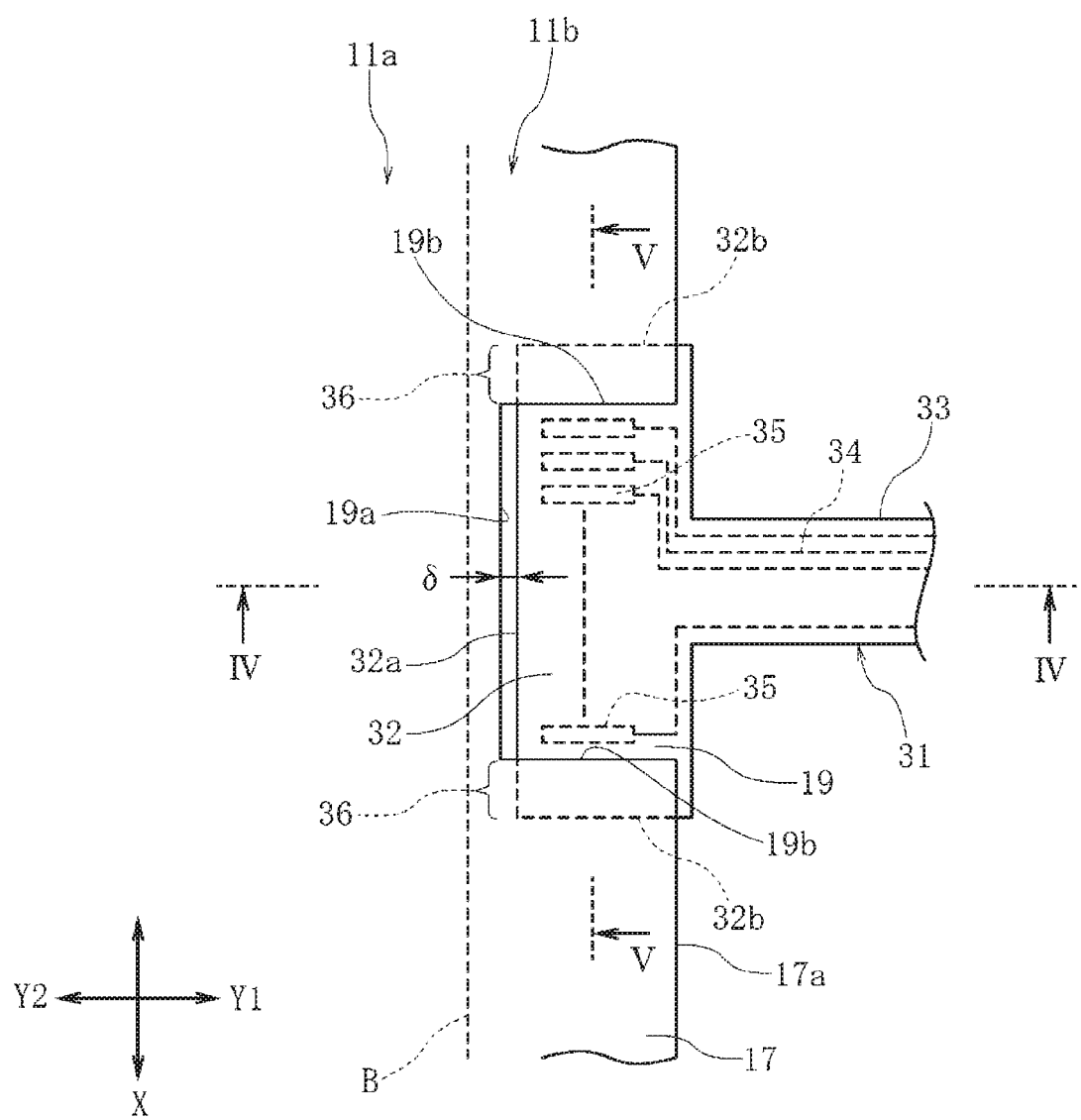
FIG. 3 is an enlarged plan view illustrating a joined portion of a flexible wiring board in the sensor unit according to the embodiment of the present invention.

As illustrated in FIGS. 2 and 3, an opening 19 is formed in the photic base material 17. The opening 19 is preferably a concave part that is open at the edge 17a on the bottom side. FIGS. 2 and 3 illustrate a boundary line B between the display and input region 11a on the sensor base material 11 and the wiring region 11b on the bottom side (Y1 side). As illustrated in FIG. 4, the boundary line B is a virtual line that corresponds to a boundary line between the decorative region 21b and the display and manipulation region 21a of the panel member 21 from below. The opening 19 formed like a concave part has an inner edge 19a extending in parallel to the boundary line B. The inner edge 19a is preferably positioned more away from the bottom side (Y1 side) than from the boundary line B. The concave part has inner edges 19b and 19b that face in the X direction.

As illustrated in FIGS. 2 and 3, as the flexible wiring board 31, a joining part 32 having a large width dimension in the transverse direction (X direction) and a pull-up part 33 having a small width dimension in the transverse direction and extending from the joining part 32 are integrally formed. The joining part 32, which is positioned on the top side (Y2 side), has an opposing edge 32a oriented toward the display and input region 11a and boundary line B, and also has both-side edges 32b and 32b, one of which faces one of both sides in the X direction and the other of which faces the other side. As illustrated in FIG. 3, a plurality of lands 35 are formed on the joining part 32 on the wiring surface, facing in the Z2 direction, of the flexible wiring board 31, and leads 34, each of which extends from one land 35, are formed in the pull-up part 33. The land 35 and lead 34 are formed from a conductive layer such as a copper foil.

Figure 5:
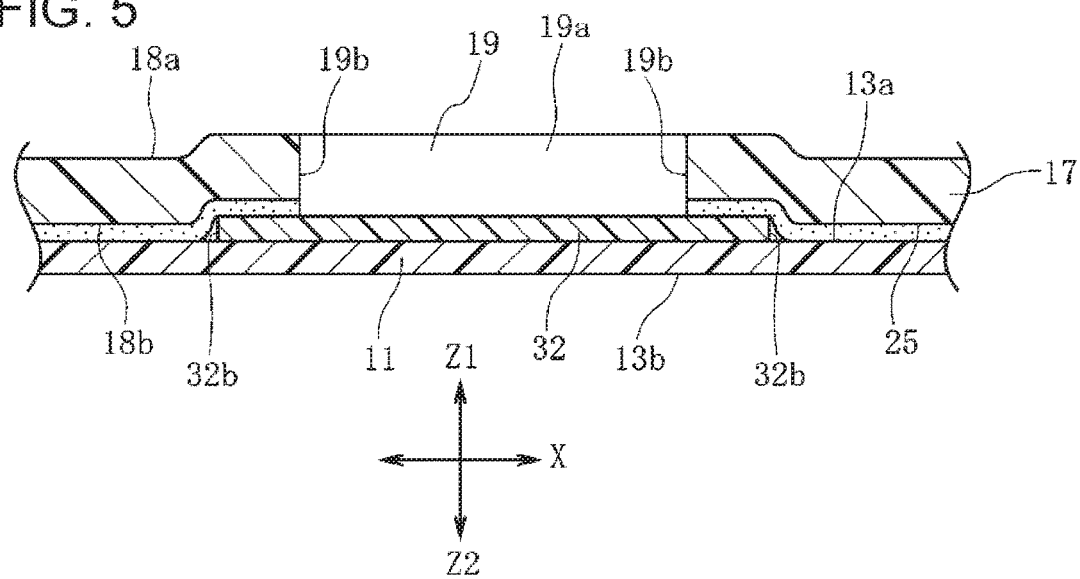
FIG. 5 is a partial cross-sectional view of the sensor unit illustrated in FIG. 3 as taken along line V-V.

As illustrated in FIGS. 3 to 5, the joining part 32 of the flexible wiring board 31 is bonded and fixed to the connector 16, illustrated in FIG. 2, formed on the forward surface 13a of the sensor base material 11 with an anisotropic conductive adhesive or the like. The lands 35 formed on the wiring surface of the joining part 32, the wiring surface facing the Z2 side, and the wiring layers 14b and 15b formed on the forward surface 13a of the sensor base material 11 are connected so as to be electrically continuous in a one-to-one correspondence.

After the joining part 32 of the flexible wiring board 31 has been joined to the sensor base material 11, the photic base material 17 is joined onto the sensor base material 11. The optical clear adhesive 25 is fastened to the backward surface 18b of the photic base material 17 in advance. When the photic base material 17 is stacked on the sensor base material 11 and pressure is applied to them, the sensor base material 11 and photic base material 17 are joined to each other.

At that time, as illustrated in FIG. 3, most of the joining part 32 of the flexible wiring board 31 is positioned in the opening 19 formed in the photic base material 17. The central portion of the opposing edge 32a of the joining part 32 in the X direction is positioned in the opening 19. Preferably, the opposing edge 32a is at a position distant from the inner edge 19a of the opening 19 on the Y2 side toward the Y1 side, forming a gap δ between the inner edge 19a and the opposing edge 32a. As illustrated in FIGS. 3 and 5, the joining part 32 has both-side substrate ends 36 and 36 on both sides in a direction (X direction) along the opposing edge 32a. Each of the both-side substrate ends 36 and 36 has one both-side edge 32b. The both-side substrate ends 36 and 36 are preferably sandwiched between the sensor base material 11 and the photic base material 17. The both-side substrate ends 36 and 36 and the sensor base material 11 are fixed with an anisotropic conductive adhesive, and the both-side substrate ends 36 and 36 and photic base material 17 are fixed with the optical clear adhesive 25.

Figure 10:
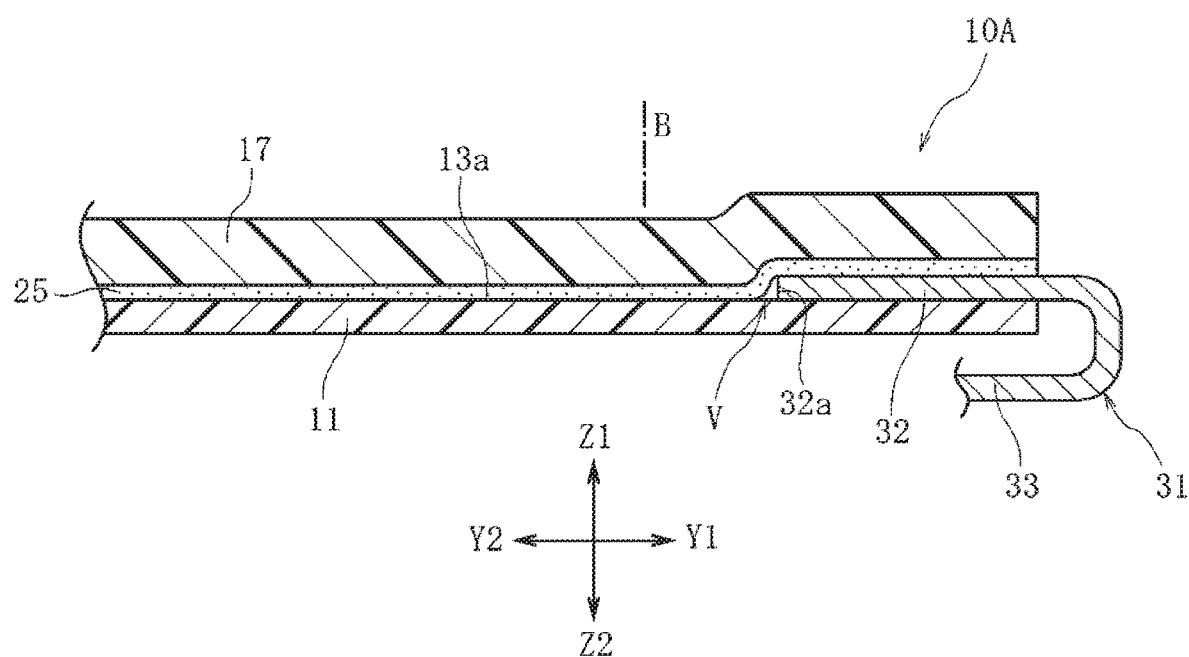
FIG. 10 is a partial cross-sectional view illustrating a joined portion of a flexible wiring board in a sensor unit according to a comparative example.

A sensor unit 10A in a comparative example is illustrated in FIG. 10. FIG. 10 is a cross-sectional view illustrating the same portion as in FIG. 4. In the comparative example, the opening 19 is not formed in the photic base material 17. As illustrated in FIGS. 4 and 10, since the joining part 32 of the flexible wiring board 31 is thicker than the optical clear adhesive 25, when the joining part 32 is sandwiched between the sensor base material 11 and the photic base material 17, the thickness of the joining part 32 cannot be complexly adapted to the thickness of the optical clear adhesive 25.

In the comparative example illustrated in FIG. 10, since the opposing edge 32a of the joining part 32 is completely sandwiched between the sensor base material 11 and the photic base material 17 from above and below and the thickness of the joining part 32 is not completely adapted to the thickness of the optical clear adhesive 25, bubbles V are likely to be generated between the optical clear adhesive 25 and the forward surface 13a of the sensor base material 11 at the opposing edge 32a. If the bubbles V generated along the opposing edge 32a proceed to the display and input region 11a on the sensor base material 11, precision in the transmission of an image displayed on the display device 3 is lowered at an edge of the display and input region 11a and the display quality of the image is adversely affected. To avoid this, it is necessary to significantly separate the opposing edge 32a of the joining part 32 from the boundary line B between the display and input region 11a and the wiring region 11b toward to the bottom side (Y1 side). As a result, it becomes necessary to narrow the joining area of the joining part 32, so the joint of the flexible wiring board 31 becomes unstable. Alternatively, it is necessary to widen the wiring region 11b and narrow the display and input region 11a.

By contrast, with the sensor unit 10 in the embodiment of the present invention, part (central portion) of the opposing edge 32a of the joining part 32 integrally formed as part of the flexible wiring board 31 is positioned in the opening 19 formed in the photic base material 17 and the gap δ is formed between the opposing edge 32a and the inner edge 19a of the opening 19, as illustrated in FIGS. 3 and 4. Therefore, it is possible to prevent bubbles V from being generated in a wide range at the central portion of the opposing edge 32a of the joining part 32 and thereby to restrain bubbles V from proceeding to the display and input region 11a on the sensor base material 11.

However, since the both-side substrate ends 36 and 36 on both sides of the joining part 32 are sandwiched between the sensor base material 11 and the photic base material 17, bubbles V may be generated at the opposing edge 32a between the both-side substrate ends 36 and 36. However, since the central portion of the opposing edge 32a is positioned in the opening 19, the bubbles V generated at the opposing edge 32a between the both-side substrate ends 36 and 36 can be released to the opening 19. Therefore, it is possible to prevent the bubbles V generated at the both-side substrate ends 36 and 36 from proceeding to the display and input region 11a.

As a result, the opposing edge 32a of the joining part 32 can be brought close to the boundary line B and the joint between the sensor base material 11 and the joining part 32 can be stabilized by widening the area of the joining part 32. It is also possible to narrow the wiring region 11b and widely allocate the display and input region 11a.

In addition, as illustrated in FIG. 5, the both-side substrate ends 36 and 36 positioned on both sides of the joining part 32 in the X direction are sandwiched between the sensor base material 11 and the photic base material 17, and the both-side substrate ends 36 and 36 are joined and fixed to both the sensor base material 11 and the photic base material 17. Therefore, it is possible to increase flexural rigidity against the bending of the joining part 32 of the flexible wiring board 31 to have the joining part 32 have curvature in the Y direction. Therefore, even if the pull-up part 33 of the flexible wiring board 31 is bent in a U-shape so as to face the backward surface 13b of the sensor base material 11 as illustrated in FIG. 4, it is possible to restrain the curvature of the joining part 32 from being increased.

In this embodiment, the opposing edge 32a of the joining part 32 linearly extends to the both-side substrate ends 36 and 36 in the X direction, as illustrated in FIG. 3. Therefore, the area of the both-side substrate ends 36 and 36 sandwiched between the sensor base material 11 and the photic base material 17 can be widened and high flexural strength against the bending of the flexible wiring board 31 can be maintained.

The sensor base material 11 in this embodiment is formed from at least one of COP, COC, and PC. These materials are superior in optical properties. Of these, however, COP and COC are particularly vulnerable and are likely to be damaged due to bend deformation. At a portion in which the joining part 32 is joined, however, the bending of the sensor base material 11 can be suppressed, so even if the sensor base material 11 is formed from these materials, damage is less likely to occur.

Since it is possible to prevent the sensor base material 11 from being largely bent partially, if, for example, the sensor base material 11 is formed from a material with relatively high strength such as a PET material, it becomes easy to prevent, for example, the peeling of the joint between the sensor base material 11 and the photic base material 17; the peeling would otherwise be caused when the sensor base material 11 is unary and is largely bent.

FIGS. 6 to 8 illustrate other embodiments of the structure of a joint between the joining part 32 of the flexible wiring board 31 and the sensor base material 11 and photic base material 17. In the description of these other embodiments, the same reference characters will be assigned to parts that bring out the same function as in the embodiment illustrated in FIGS. 1 to 5.

In an embodiment illustrated in FIG. 6A, both-side edges 32c and 32c on the Y2 side and both-side edges 32d and 32d on the Y1 side are formed at the joining part 32 of the flexible wiring board 31 through steps. The opposing edge 32a facing the display and input region 11a and the both-side edges 32c and 32c on the Y2 side are positioned in the opening 19, and the both-side edges 32d and 32d on the Y1 side are sandwiched between the sensor base material 11 and the photic base material 17. Therefore, the both-side substrate ends 36 and 36, sandwiched between the sensor base material 11 and the photic base material 17, of the joining part 32 can be positioned significantly distant from the boundary line B and opposing edge 32a toward the Y1 side.

Since the opposing edge 32a of the joining part 32 and the both-side edges 32c and 32c on the Y2 side are positioned in the opening 19, it is possible to prevent bubbles V from being formed at the opposing edge 32a and both-side edges 32c and 32c. Even if bubbles V are generated around the both-side substrate ends 36 and 36, since the both-side substrate ends 36 and 36 are significantly distant from the boundary line B, these bubbles V are less likely to adversely affect the display and input region 11a.

In an embodiment illustrated in FIG. 6B, on both sides of the joining part 32 in the X direction, both-side edges 32e and 32e on the Y2 side are inclined so as to more separate from each other toward the Y1 direction, and the both-side edges 32d and 32d on the Y1 side are parallel to the Y1-Y2 direction. Since the both-side edges 32e and 32e on the Y2 side are inclined, the both-side substrate ends 36 and 36, sandwiched between the sensor base material 11 and the photic base material 17, of the joining part 32 can be separated from the boundary line B toward to the Y1 side. Therefore, even if bubbles V are generated along the inclined both-side edges 32e and 32e, these bubbles V are less likely to adversely affect the display and input region 11a.

In the embodiments illustrated in FIGS. 6A and 6B, if the maximum value of the width dimension of the joining part 32 in the Y1-Y2 direction is the same and the spacing between the both-side edges 32d and 32d in the X direction is the same, it is possible to allocate wider areas for the both-side substrate ends 36 and 36 sandwiched between the sensor base material 11 and the photic base material 17 in the embodiment in FIG. 6B than in the embodiment illustrated in FIG. 6A. In FIG. 6B, therefore, when the flexible wiring board 31 is bent, a warp force exerted on the sensor base material 11 in the portion where the joining part 32 is joined can be reduced.

In an embodiment illustrated in FIG. 7A, a rectangular hole is preferably formed in the translucent base material 17 as an opening 119, its entire circumference being enclosed by its inner edges. The opposing edge 32a of the joining part 32 of the flexible wiring board 31 and portions of the both-side edges 32b and 32b on the Y2 side are positioned below the opening 119. Therefore, it is possible to restrain bubbles V from being generated at the opposing edge 32a and in the portions of the both-side edges 32b and 32b on the Y2 side.

In addition, a portion of the joining part 32 on the Y1 side is sandwiched between the sensor base material 11 and the photic base material 17 over the entire length in the X direction. Therefore, even if the pull-up part 33 of the flexible wiring board 31 is bent as illustrated in FIG. 4, a bend with large curvature is less likely to be generated in a portion where the joining part 32 and sensor base material 11 are bonded together. This prevents the sensor base material 11 from being damaged in the portion where the joining part 32 is joined or makes the problem less likely to arise that, for example, peeling occurs at the joined portion between the sensor base material 11 and the photic base material 17.

In an embodiment illustrated in FIG. 7B, an elongated hole is formed in the photic base material 17 as an opening 219. In this embodiment as well, the opposing edge 32a of the joining part 32 and portions of both-side edges 32c and 32c on the Y2 side are positioned below the opening 219, so bubbles V are not generated at the both-side edges 32c and 32c. The both-side substrate ends 36 and 36 of the joining part 32 protrudes from the opening 219 toward one of both sides in the X direction at positions significantly distant from the opposing edge 32a toward the Y1 side, one toward each end. These both-side substrate ends 36 and 36 are sandwiched between the sensor base material 11 and the photic base material 17. Therefore, even if bubbles V are generated at the edge between the both-side substrate ends 36 and 36, the bubbles V do not proceed to the boundary line B. Since the both-side substrate ends 36 and 36 are sandwiched between the sensor base material 11 and the photic base material 17, bend deformation is even less likely to occur in the joining part 32.

In an embodiment illustrated in FIG. 8A, an opening 319 formed in the photic base material 17 is composed of a plurality of concave parts (at two places) separated in the X direction. In this embodiment, the joining part 32 of the flexible wiring board 31 is sandwiched not only between the sensor base material 11 and the photic base material 17 at both-side substrate ends 36a and 36a positioned at both ends in the X direction, but also between the sensor base material 11 and photic base material 17 at the central portion 36b of the joining part 32. That is, the joining part 32 is bonded and fixed to both the sensor base material 11 and the photic base material 17 at three places, both-side substrate ends 36a and 36a and central portion 36b. In this embodiment, the ratio of an area, of the joining part 32, that is bonded and fixed to both the sensor base material 11 and the photic base material 17 is high, so when the pull-up part 33 of the flexible wiring board 31 is bent, the joining part 32 is less likely to be bent.

In an embodiment illustrated in FIG. 8B, an opening 419 formed in the photic base material 17 is composed of holes at three places. In this embodiment as well, the ratio of an area, of the joining part 32, that is bonded and fixed to both the sensor base material 11 and the photic base material 17 is high, so when the pull-up part 33 of the flexible wiring board 31 is bent, the joining part 32 is less likely to be bent.

In the embodiments illustrated in FIGS. 8A and 8B, since part of the opposing edge 32a of the joining part 32 is sandwiched between the sensor base material 11 and the photic base material 17, bubbles V may be generated along the opposing edge 32a at that portion. However, since these bubbles V are likely to be released into the opening 319 or 419, the bubbles V are less likely to be transmitted to the display and input region 11a.

Figure 9A:
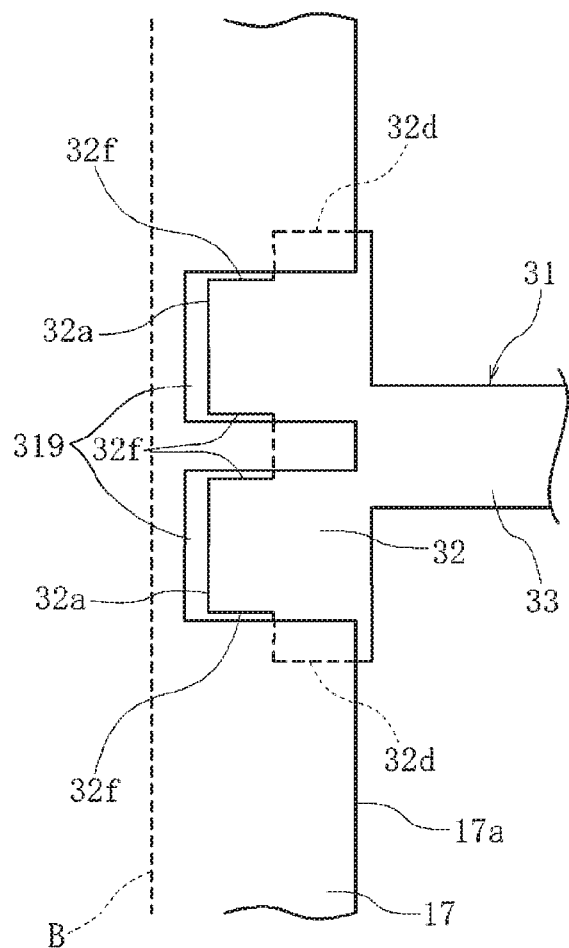
FIGS. 9A and 9B are enlarged plan views, each of which illustrates a joined portion of a flexible wiring board in a sensor unit according to still another embodiment.
Figure 9B:
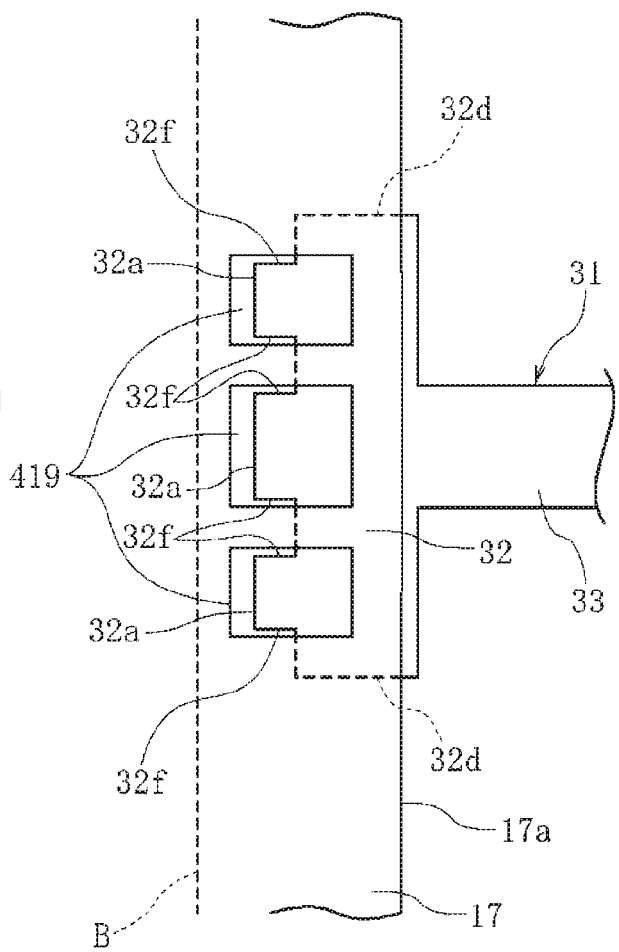

Embodiments illustrated in FIGS. 9A and 9B are respectively variations of the embodiments illustrated in FIGS. 8A and 8B. In FIGS. 9A and 9B, notches are formed; each notch is recessed from one opposing edge 32a of the joining part 32 toward the bottom side (Y1 side), and the opposing edge 32a and short edges 32f positioned at both ends of the opposing edge 32a in the X direction are positioned in the opening 319 or 419 formed in the photic base material 17. As a result, the opposing edge 32a and the short edges 32f at both ends of the opposing edge 32a are positioned in the opening 319 or below the opening 419, so it becomes possible to prevent bubbles V from being generated near the boundary line B.

In the embodiment illustrated in FIG. 3 and the embodiments illustrated in FIGS. 8A and 8B, it is preferable that at least a half of the opposing edge 32a, which linearly extends in the X direction at the joining part 32, be positioned in the opening 19 or 319 or below the opening 419, and is more preferable that at least 70% of the opposing edge 32a be positioned in the opening 19 or 319 or below the opening 419.

What is claimed is:

1. A sensor unit comprising:
    a sensor base made of a translucent material and having a first surface, the sensor base including:
        a display region defined on the first surface, the display region having a translucent electrode layer formed therein; and
        a wiring region defined on the first surface peripheral to the display region and positioned closer to an edge of the sensor base than to the display region, the wiring region having a wiring layer extending from the translucent electrode layer;
    a flexible wiring board joined to the first surface of the sensor base in the wiring region, the flexible wiring board having a lower surface joined to the first surface and an upper surface on an opposite side of the lower surface, the flexible wiring board having a conductive layer provided thereon electrically connected to the wiring layer; and
    a light-transmitting base bonded to the sensor base such that part of the flexible wiring board is sandwiched between the first surface of the sensor base and a lower surface of the light-transmitting base, the light-transmitting base having an opening formed in an area corresponding to the wiring region,
    wherein the flexible wiring board includes:
        a first portion having the conductive layer and disposed within the opening of the light-transmitting base, the first portion having an opposing edge facing a boundary of the display region on the first surface, at least part of the opposing edge facing an inner edge of the opening so as to form a gap exposing the first surface between the inner edge of the opening and the at least part of the opposing edge viewed from a direction perpendicular to the first surface; and
        a second portion not having the conductive layer, the second portion sandwiched and thereby bonded between the sensor base and the light-transmitting base,
    and wherein the upper surface of the flexible wiring board is farther from the first surface than the lower surface of the light-transmitting base along the gap such that a thickness of the flexible wiring board and that of the light-transmitting base overlap with each other in the direction perpendicular to the first surface along the gap, while the lower surface of the light-transmitting base is disposed above the upper surface of the flexible wiring board in the second portion.

2. The sensor unit according to claim 1, wherein the sensor base is formed from at least one of a cycloolefin polymer (COP), a cycloolefin copolymer (COC), and a polycarbonate (PC).

3. The sensor unit according to claim 1, wherein the light-transmitting base is made of an optical adjustment material which changes an optical characteristic of light transmitting therethrough.

4. The sensor unit according to claim 1, wherein a pair of side end portions of the flexible wiring board are sandwiched between the sensor base and the light-transmitting base, the pair of side end portions being positioned at both ends of the opposing edge of the flexible wiring board.

5. The sensor unit according to claim 4, wherein the pair of side end portions between the sensor base and the light-transmitting base are disposed farther away from the display region than the opposing edge is.

6. The sensor unit according to claim 5, wherein the opening is a cutout formed on an edge portion of the light-transmitting base.

7. The sensor unit according to claim 6, wherein an inner edge of the cutout closest to the display region is located within the wiring region and away from a boundary line between the display region and the wiring region.

8. The sensor unit according to claim 4, wherein the opening is a cutout formed on an edge portion of the light-transmitting base.

9. The sensor unit according to claim 8, wherein an inner edge of the cutout closest to the display region is located within the wiring region and away from a boundary line between the display region and the wiring region.

10. The sensor unit according to claim 1, wherein the opening is at least one hole enclosed by an inner edge, the hole being positioned between the edge of the light-transmitting base and a boundary line between the display region and the wiring region.

11. An input device, comprising:
    sensor unit according to claim 1; and
    a translucent panel member bonded a top surface of the light-transmitting base, a top surface of the translucent panel member being a manipulation surface for the input device.

12. The sensor unit according to claim 1, wherein the light-transmitting base includes at least one of a polarizing plate and a ¼-λ phase difference plate.

* * * * *